United States Patent [19]

Kamikado

[11] Patent Number: 5,336,702
[45] Date of Patent: Aug. 9, 1994

[54] AQUEOUS RESIN DISPERSIONS

[75] Inventor: Koji Kamikado, Yokohama, Japan

[73] Assignee: Kansai Paint Co., Ltd., Hyogo, Japan

[21] Appl. No.: 985,218

[22] Filed: Dec. 3, 1992

[30] Foreign Application Priority Data

Dec. 5, 1991 [JP] Japan .................. 3-348372

[51] Int. Cl.$^5$ .......................... C08K 3/20; C08L 63/00
[52] U.S. Cl. ..................... 523/417; 523/400;
523/402; 523/404; 523/414; 523/415; 524/591;
528/44; 528/73; 528/74; 528/103; 528/104;
525/528
[58] Field of Search ............... 523/400, 402, 404, 414,
523/415, 417; 524/591; 528/44, 73, 74, 103,
104; 525/528

[56] References Cited

U.S. PATENT DOCUMENTS

| | | | |
|---|---|---|---|
| 3,922,253 | 11/1975 | Jerabek et al. | 260/77.5 TB |
| 4,147,679 | 4/1979 | Scriven et al. | 523/415 |
| 4,804,710 | 2/1989 | Nakata et al. | 525/111 |
| 4,883,830 | 11/1989 | Kitabatake et al. | 528/103 |
| 5,187,198 | 2/1993 | Nishida et al. | 523/415 |

FOREIGN PATENT DOCUMENTS 0175474 3/1986 European Pat. Off. .
0350232 1/1990 European Pat. Off. .

Primary Examiner—Paul R. Michl
Assistant Examiner—P. Niland
Attorney, Agent, or Firm—Wenderoth, Lind & Ponack

[57] ABSTRACT

An aqueous resin dispersion containing as an aqueous resin component a polyurethane-modified epoxy-polyamine resin comprising a reaction product of an epoxy group-containing polyurethane compound obtained by the reaction of a polyhydroxy compound having a number average molecular weight of 50 to 8,000, a polyisocyanate compound, and a compound containing one hydroxyl group and at least one alicyclic epoxy group in a molecule; a bisphenol compound; a bisphenol diglycidyl ether compound; and an active hydrogen-containing amine compound. Said aqueous resin dispersion has excellent corrosion resistance and is suited especially for cathode electro-deposition coating.

29 Claims, No Drawings

AQUEOUS RESIN DISPERSIONS

This invention relates to a novel aqueous resin dispersion, and more specifically to an aqueous resin dispersion having improved corrosion resistance and especially suited for cathode electrodeposition coating.

As a resin composition used in an aqueous resin dispersion for use in a cathode electrodeposition paint, a resin composition comprising a combination of an epoxy-polyamine resin obtained by the reaction of an epoxy group-containing resin and a polyamine and a polyisocyanate curing agent blocked with an alcohol has been known as disclosed in, e.g., U.S. Pat. No. 3,922,253 (Japanese Laid-open Patent Application No. 93024/1979). As the epoxy group-containing resin, bisphenol A diglycidyl ether rendered high-molecular-weight with bisphenol A has been commonly used from the aspect of corrosion resistance. Moreover, epoxy resins plastisized by introducing therein a modifying agent such as partially soft polyesters, polyethers, polyamides, polybutadiene, a butadiene-acrylonitrile copolymer, etc. have been also put to practical use.

Development of paints having high corrosion resistance has been increasingly demanded from the standpoint of performance of a coated film in the field of electrode position coating of automobile bodies or parts in lower portions.

To meet the demands, when the amount of the modifier for plastisization incorporated so far in the epoxy resin is decreased to impart high corrosion resistance in cathode electrodeposition coating, corrosion resistance is indeed increased, but flexibility and smoothness of a coated surface become poor.

Accordingly, the present inventors have made assiduous investigations to form a resin composition for use in an aqueous resin dispersion which has high corrosion resistance and gives flexibility of a coated film and smoothness of a coated surface. As a result, they have found that the above object can be achieved by using a specific epoxy-polyamine resign with polyurethane as a modifier, and have completed this invention.

Thus, according to this invention, there is provided an aqueous resin dispersion containing as an aqueous resin component a polyurethane modified epoxy-polyamine resin comprising a reaction product of (A) an epoxy group-containing polyurethane compound obtained by the reaction of
  (a) a polyhydroxy compound having a number average molecular weight of 50 to 8,000,
  (b) a polyisocyanate compound, and
  (c) a compound containing one hydroxyl group and at least one alicyclic epoxy group in a molecule,
(B) a bisphenol compound,
(C) a bisphenol diglycidyl ether compound, and
(D) an active hydrogen-containing amine compound.

The aqueous resin dispersion of this invention will be described in more detail below.

Epoxy group-containing polyurethane compound (A)

The epoxy group-containing polyurethane compound (A) used in this invention is formed by the reaction of (a) a polyhydroxy compound having a number average molecular weight of 50 to 8,000, (b) a polyisocyanate compound, and (c) a compound containing one hydroxyl group and at least one alicyclic epoxy group in a molecule.

The polyhydroxy compound (a) having the number average molecular weight of 50 to 8,000, which can constitute part of the epoxy group-containing polyurethane compound (A) can include a wide variety of compounds if the number average molecular weight is within the above range. Examples of the compound (A) are polyhydric alcohols, polyester polyols or polyether polyols generally used to produce urethane compounds, and mixtures thereof. The polyester polyols include condensates of polyhydric alcohols and polybasic carboxylic acids, condensates of hydroxycarboxylic acids and polyhydric alcohols, and compounds formed by ring-opening cyclic lactones.

The polyhydric alcohols used to produce the polyhydric alcohols and the polyester polyols are aliphatic alcohols containing in a molecule 2 to 4 alcoholic hydroxyl groups, preferably 2 to 3 alcoholic hydroxyl groups as well as 2 to 50 carbon atoms, preferably 2 to 20 carbon atoms. Examples thereof are ethylene glycol, propylene glycol, butanediol, diethylene glycol, polytetramethylene glycol, polypropylene glycol, 3-methyl-1,5-pentanediol, glycerin, 1,6-hexanediol, trimethylolpropane, and pentaerythritol.

Examples of the polybasic carboxylic acids used to produce the polyester polyols are adipinic acid, azelaic acid, dimer acid, glutaric acid, and pyromellitic acid. Examples of the hydroxycarboxylic acids are hydroxyacetic acid, hydroxypropionic acid and lactic acid. Examples of the cyclic lactones are epsilon-caprolactone, beta-methyl-delta-valerolactone, zeta-emelactone, and gamma-valerolactone.

The polyether polyols are products obtained by addition-condensing one or more alkylene oxides such as ethylene oxide, propylene oxide, butylene oxide and tetrahydrofuran with a compound containing two or more active hydrogens, and various known polyether polyols used to produce polyurethane resins are available. Examples of the compound containing two or more active hydrogens are the aforesaid polyhydric alcohols and polybasic carboxylic acids as well as amines such as ethylenediamine and hexamethylenediamine, alkanolamines such as ethanolamine and propanol amine, polyhydric phenols such as bisphenol, and a castor oil.

The polyhydroxy compound (a) can contain on the average two or more hydroxyl groups, preferably 2 to 4 hydroxyl groups in a molecule and have a number average molecular weight of 50 to 8,000, preferably 50 to 6,000, more preferably 50 to 3,000.

The above polyhydroxy compound (a) can be used either singly or in the form of a mixture of a low-molecular-weight polyhydroxy compound having a number average molecular weight of 50 to 499, preferably 50 to 300 and a high-molecular-weight polyhydroxy compound having a number average molecular weight of 500 to 8,000, preferably 500 to 3,000.

The low-molecular-weight polyhydroxy compound includes, for example, among the aforesaid polyhydric alcohols, polyester polyols and polyether polyols, those having a molecular weight of 499 or less. The high-molecular-weight polyhydroxy compound includes, for example, among the above polyester polyols and polyether polyols, those having a molecular weight of 500 to 8,000. The mixing ratio of the high-molecular-weight polyhydroxy compound and the low-molecular-weight polyhydroxy compound is not particularly limited and can vary with required performance. The proportion of the low-molecular-weight polyhydroxy compound is about 5 to about 70 parts by weight, preferably about 10 to about 50 parts by weight per 100 parts by weight of the high-molecular-weight polyhydroxy compound.

Especially preferable examples of the aforesaid polyhydroxy compound (a) are ethylene glycol, propylene glycol, 1,6-hexanediol, butanediol, polypropylene glycol, polytetramethylene glycol, and ring-opened polycaprolactone.

The polyisocyanate compound (b) that can be used to produce the epoxy group-containing polyurethane compound (A) is a compound containing two or more isocyanate groups in a molecule, and various compounds generally used to produce polyurethane resins are available. The polyisocyanate compound (b) includes aliphatic, alicyclic and araliphatic polyisocyanate compounds. Typical examples thereof are as follows.

Aliphatic polyisocyanate compound: hexamethylene diisocyanate (HMDI), biureted HMDI, and isocyanurated HMDI Alicyclic polyisocyanate compound: isophorone diisocyanate (IPDI), biureted IPDI, isocyanurated IPDI, hydrogenated xylylene diisocyanate, and hydrogenated 4,4'-diphenylmethane diisocyanate Araliphatic polyisocyanate compound: xylylene diisocyanate, and m- (or p-)tetramethylene diisocyanate They may be used either singly or in combination. Of the above compounds, IPDI, HMDI and xylylene diisocyanate are preferable.

Moreover, the compound (c) containing in the molecule one hydroxyl group and at least one alicyclic epoxy group, which can constitute part of the epoxy group-containing polyurethane compound (A), includes an alicyclic compound containing one hydroxyl group and at least one, preferably one or two epoxy groups (oxirane groups) directly bound to an alicyclic carbon ring (having no carbon-carbon double bond) comprising 5 to 6 carbon atoms. Such a compound has a number average molecular weight of usually about 100 to about 5,000, preferably about 100 to about 2,000, an epoxy equivalent of usually about 100 to about 1,000, preferably about 120 to about 600, and a melting point of about 130° C. or less, preferably about 50° to about 115° C.

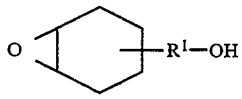
(I)

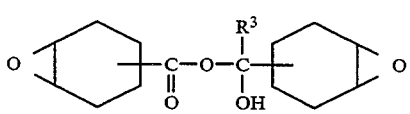
(II)

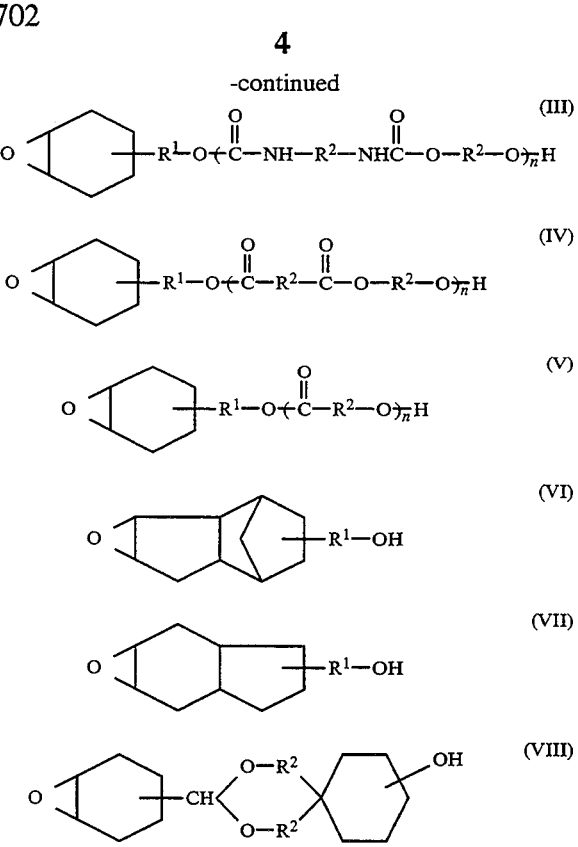

wherein $R^1$ denotes a direct bond or a $C_{1-20}$ divalent hydrocarbon group, $R^2$'s are the same or different and each denotes a $C_{1-8}$ divalent hydrocarbon group, $R^3$ denotes H or $CH_3$, and n is an integer of 1 to 10.

The above divalent hydrocarbon group may be a saturated aliphatic, aromatic or alicyclic group or a combination thereof. The saturated aliphatic hydrocarbon group may be either linear or branched. The aromatic hydrocarbon group includes a group having an aromatic ring substituted with an alkyl group. Desirable examples of the $C_{1-8}$ divalent hydrocarbon group are methylene, ethylene, propylene, 2-methylpropylene, hexamethylene, phenylene,

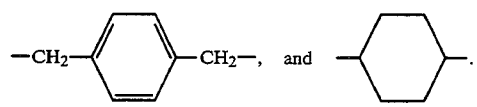

Desirable examples of the $C_{1-20}$ divalent hydrocarbon group are, besides the above $C_{1-8}$ divalent hydrocarbon groups, decamethylene and octadecamethylene.

Commercially available examples thereof are as follows.

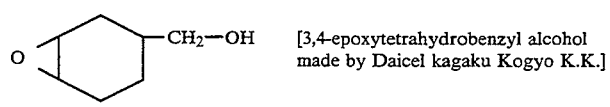
[3,4-epoxytetrahydrobenzyl alcohol made by Daicel kagaku Kogyo K.K.]

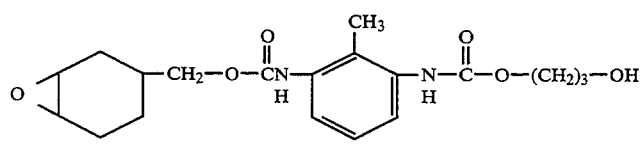

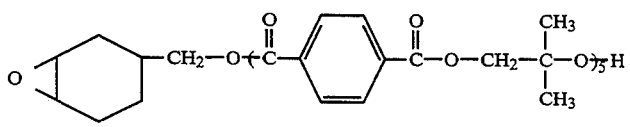

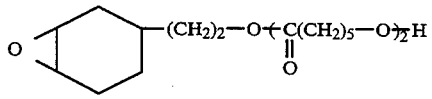

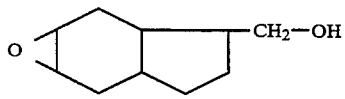

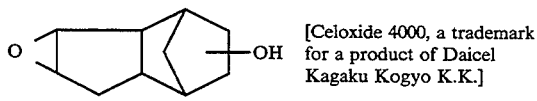

[Celoxide 4000, a trademark for a product of Daicel Kagaku Kogyo K.K.]

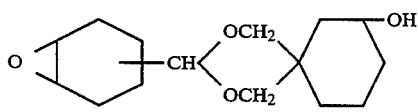

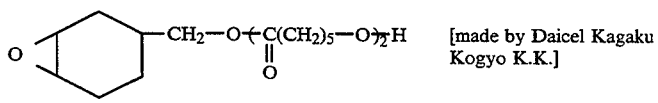

[made by Daicel Kagaku Kogyo K.K.]

The epoxy group-containing polyurethane compound (A) can be produced by, for example, (i) mixing the aforesaid three components (a), (b) and (c), or (ii) previously reacting the two components (a) and (b) to form an isocyanate-terminated urethane prepolymer, and then reacting the urethane prepolymer with the component (c).

Of the above two methods (i) and (ii), the latter (ii) is preferable. To be more specific, the epoxy group-containing polyurethane compound (A) can be produced by mixing the polyisocyanate compound (b) and the polyhydroxy compound (a) at such a ratio that the amount of the hydroxyl group of the compound (a) is 1 equivalent or less, preferably 0.70 to 0.98 equivalent per equivalent of the isocyanate group of the compound (b), conducting the reaction until an unreacted hydroxyl group is substantially no longer present to produce an isocyanate group-terminated urethane prepolymer, mixing the obtained urethane prepolymer with the compound (c) at such a ratio that the amount of the hydroxyl group of the compound (c) is 1 equivalent or more, preferably about 1.0 to about 1.1 equivalents per equivalent of the isocyanate group of the urethane prepolymer, and conducting the reaction until an unreacted hydroxyl group is substantially no longer present.

In the reaction of the isocyanate group with the hydroxyl group, a known catalyst for synthesis of the urethane, for example, a tertiary amine (e.g., triethylamine) or an organometallic compound (e.g., dibutyltin dilaurate) can be added if required.

The amounts of the three components (a), (b) and (c) used to produce the epoxy group-containing polyurethane compound (A) are not strictly limited and can vary with usage of the final product, properties required thereof, etc. For example, the following ranges can be shown on the basis of the total weight of the three components (a), (b) and (c).

Polyhydroxy compound (a): usually 5 to 80% by weight, preferably 20 to 60% by weight, more preferably 25 to 55% by weight Polyisocyanate compound (b): usually 5 to 90% by weight, preferably 10 to 60% by weight, more preferably 20 to 55% by weight.

Alicyclic epoxy compound (c): usually 10 to 90% by weight, preferably 30 to 70% by weight, more preferably 30 to 50% by weight The thus formed epoxy group-containing polyurethane compound (A) can have a number average molecular weight of usually 400 to 10,000, preferably 400 to 7,000, more preferably 1,000 to 4,000, and an epoxy equivalent of usually 100 to 5,000, preferably 200 to 4,000, more preferably 400 to 2,000.

Bisphenol compound (B)

The bisphenol compound (B) includes a compound represented by formula (IX)

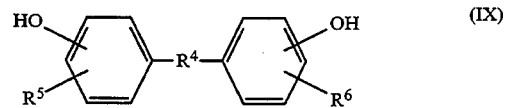

(IX)

wherein $R^4$ denotes

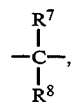

—O— or —SO$_2$—, $R^7$ and $R^8$ each denote a hydrogen atom or a linear or branched $C_{1-10}$ alkyl group, and $R^5$ and $R^6$ each denote a hydrogen atom or a linear or branched $C_{1-3}$ alkyl group.

Examples of the bisphenol compound (B) are bis(4-hydroxyphenyl)-2,2-propane (bisphenol A), bis(4-hydroxyphenyl)-1,1-ethane, bis(4-hydroxyphenyl)methane (bisphenol F), 4,4'-dihydroxydiphenyl ether, 4,4'-dihydroxydiphenylsulfone, bis(4-hydroxyphenyl)-1,1-isobutane, and bis(4-hydroxy-3-tert-butylphenyl)-2,2-propane. Of these, bisphenol A, bisphenol F and 4,4'-dihydroxydiphenyl ether are preferable.

Bisphenol diglycidyl ether compound (C)

The bisphenol diglycidyl ether compound (C) includes a diglycidyl ether compound of the above bisphenol compound of formula (IX) or its epoxy ring-opened polymer represented by formula (X)

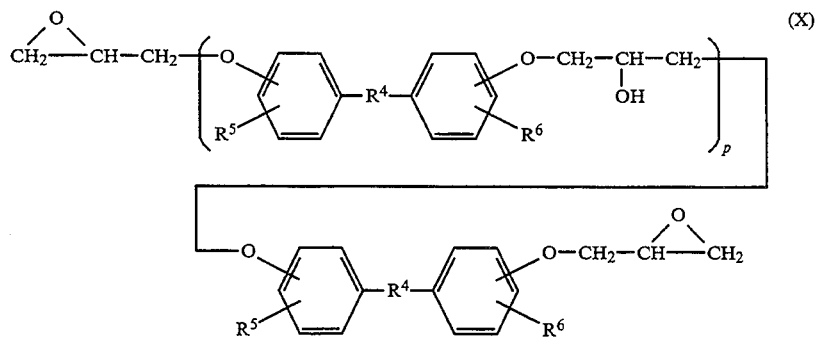

wherein $R^4$, $R^5$ and $R^6$ are as defined in formula (IX), and p is an integer of 0 to 10.

As the above bisphenol diglycidyl ether compound (C), bisphenol diglycidyl ether having a number average molecular weight of about 310, preferably about 320 to about 2,000, more preferably 320 to 1,000, and an epoxy equivalent of at least about 155, preferably about 160 to about 1,000, more preferably 160 to 500 is suitable. Especially, bisphenol A diglycidyl ether represented by the following formula is preferable from the aspects of flexibility and corrosion resistance.

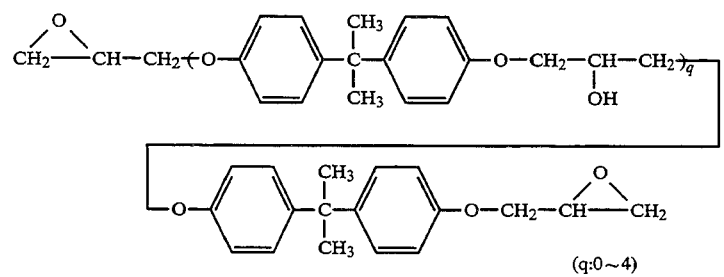

(q:0~4)

Active hydrogen-containing amine compound (D)

The active hydrogen-containing amine compound (D) is an amine compound containing at least one active hydrogen and capable of reacting with an oxirane group, such as aliphatic, alicyclic and araliphatic, primary or secondary amines, alkanolamines and tertiary amine salts. The amine compound (D) helps introduce the amino group or the quaternary ammonium salt into the polyurethane modified epoxy resin formed by the reaction of the three components (A), (B) and (C). Typical examples of the active hydrogen-containing amine compound are as follows.

(1) A compound obtained by converting a primary amino group of a polyamine compound containing one secondary amino group and one or more primary amino groups, such as diethylenetriamine, hydroxyethylaminoethylamine, ethylaminoethylamine, and methylaminopropylamine into aldimine, ketimine, oxazoline or imidazoline by heat-reacting with a ketone, an aldehyde or a carboxylic acid at a temperature of, e.g., about 100° to 230° C.

(2) A secondary monoamine such as diethylamine, diethanolamine, di-n- or di-iso-propanolamine, N-methylethanolamine, or N-ethylethanolamine.

(3) A secondary amine-containing compound obtained by adding a monoalkanolamine such as monoethanolamine and a dialkyl (meth)acrylamide by Michael addition reaction.

(4) A compound obtained by converting into ketimine a primary amino group of an alkanolamine such as monoethanolamine, neopentanolamine, 2-aminopropanol, 3-aminopropanol, or 2-hydroxy-2'-(aminopropoxy)ethyl ether.

(5) A salt of a tertiary amine such as dimethylethanolamine, triethylamine, trimethylamine, triisopropylamine, or methyldiethanolamine.

Of the above amine compounds, diethanolamine, diethylamine, N-methylethanolamine and N-ethylethanolamine are especially preferable.

Production of the polyurethane modified epoxy-polyamine resin

The polyurethane-modified epoxy-polyamine resin of this invention (hereinafter referred to at times as a "resin of this invention") can be produced, for example, by reacting the epoxy group-containing polyurethane compound (A) with the bisphenol compound (B) and the bisphenol diglycidyl ether compound (C) to form a polyurethane modified epoxy resin and further adding the active hydrogen-containing amine compound (D).

The resin of this invention is produced, for example, by reacting the epoxy group-containing polyurethane compound (A) with more than 1 equivalent, per equivalent of the epoxy group, of the bisphenol compound (B), reacting the terminal hydroxyl group of the obtained resin with more than 1 equivalent, per equivalent of the hydroxyl group, of the bisphenol diglycidyl ether compound (C), and then adding the amine compound (D) to the terminal oxirane group of the obtained polyurethane modified epoxy resin. This method is especially desirous from the aspects of designing of the resin and controlling. The addition of the amine compound (D) can be conducted simultaneously with the formation of the polyurethane-modified epoxy resin.

In producing the polyurethane-modified epoxy resin by the reaction of the epoxy group-containing polyurethane compound (A), the bisphenol compound (B), and the bisphenol diglycidyl ether compound (C), the amount each of said compounds (A), (B) and (C) based on the total weight of said three components is as follows.

Component (A): usually 10 to 70% by weight, preferably 10 to 60% by weight, more preferably 15 to 60% by weight Component (B): usually 5 to 60% by weight, preferably 5 to 50% by weight, more preferably 5 to 40% by weight Component (C): usually 10 to 70% by weight, preferably 10 to 60% by weight, more preferably 10 to 50 % by weight From the aspect of corrosion resistance, it is advisable that the obtained polyurethane-modified epoxy resin has a number average molecular weight of usually 1,000 to 20,000, preferably 1,000 to 5,000.

The reaction of the compounds (A), (B) and (C) to obtain the polyurethane-modified epoxy resin, i.e., the reaction of the oxirane group and the hydroxyl group, can be carried out in a manner known per se, for example, by heating at a temperature of about 40° to about 200° C. for about 1 to 15 hours in the presence of a catalyst, e.g., a tertiary amine such as triethylamine, tributylamine or dimethylbenzylamine, or a fluorinated boron compound such as boron trifluoride monoethylamine and zinc borofluoride.

The thus obtained polyurethane-modified epoxy resin can then be converted into the polyurethane-modified epoxy-polyamine resin of this invention by the addition of the active hydrogen-containing amine compound (D).

The polyurethane-modified epoxy-polyamine resin of this invention can be formed by reacting the active hydrogen-containing amine compound (D) with the oxirane group of the polyurethane-modified epoxy resin at a temperature of, e.g., about 30° to about 160° C. for about 1 to about 5 hours. Moreover, the addition of the amine compound (D) to the polyurethane-modified epoxy resin can also be effected simultaneously with the production of the polyurethane-modified epoxy resin.

The active hydrogen-containing amine compound (D) is used in such an amount that the amine value of the polyurethane-modified epoxy-polyamine resin in this invention is usually 15 to 100, preferably 15 to 80, more preferably 20 to 60. The above polyurethane-modified epoxy-polyamine resin is reacted with a reaction reagent such as a tertiary amine salt, a monocarboxylic acid, a secondary sulfide salt, a monophenol or a monoalcohol so as to be able to improve control of water dispersibility or smoothness of a coated film.

Further, the polyurethane-modified epoxy-polyamine resin of this invention can have internal crosslinkability by introducing therein a crosslinkable functional group such as a blocked isocyanate group, a betahydroxycarbamic acid ester group, an alpha,beta-unsaturated carbonyl group, or an N-methylol group.

The reaction with the reaction reagent and the introduction of the crosslinkable functional group may be carried out before adding the active hydrogen-containing amine compound (D) into the polyurethane-modified epoxy resin.

The thus obtained polyurethane-modified epoxypolyamine resin can be used conjointly with an external crosslinking agent. Said external crosslinking agent can be a compound containing two or more crosslinkable groups in a molecule, such as a blocked polyisocyanate, a polyamine beta-hydroxycarbamic acid ester, a malic acid ester derivative, a methylolated melamine, and a methylolated urea. The polyurethane-modified epoxy-polyamine resin/external crosslinking agent mixing ratio (as a solids content) is usually 100/0 to 60/40, preferably 95/15 to 65/35.

In order to prepare the aqueous resin dispersion, the polyurethane-modified epoxy-polyamine resin of this invention can be water-solubilized or water-dispersed by protonating at least part of the amino groups of the resin with a water-soluble organic acid such as formic acid, acetic acid, or lactic acid.

The amount of the acid (neutralization value) used for protonation cannot strictly be defined. It is, however, usually about 5 to 40 KOH mg, preferably 10 to 20 KOH mg per gram of the resin solids content from the standpoint of electrodeposition characteristics. The thus obtained aqueous solution or aqueous dispersion is especially suited for cathode electrodeposition coating. On this occasion, a pigment, a solvent, a curing catalyst, and a surface active agent can be used if required.

As a method and an apparatus for electrodeposition on a product being coated using the aqueous resin dispersion of this invention, a method and a device known per se in cathode electrodeposition coating are available. At that time, it is advisable to use the product being coated as a cathode and a stainless steel or carbon plate as an anode. The electrodeposition coating conditions are not particularly limited. Generally, it is desirable to conduct electrodeposition coating with stirring under conditions of a bath temperature: 20°–30° C., a voltage: 100–400 V (preferably 200–300 V), a current density: 0.01–3 A/dm$^2$, a time of passing electricity: 1–5 minutes, a pole area ratio (A/C): 2/1–1/2, and a pole distance: 10–100 cm.

The coated film deposited on the cathode coated product can be, after washing, cured by baking at a temperature of, e.g., about 140° to about 180° C.

The aqueous resin dispersion of this invention can form the coated film excellent in flexibility and appearance without decrease in corrosion resistance of the epoxy resin because in the epoxy-polyamine resin modified with the epoxy group-containing polyurethane compound, which is used as the aqueous resin component, as stated above, the main structure of the epoxy group-containing polyurethane is composed of the polyurethane linkage by the reaction of the polyhydroxy compound and the polyisocyanate compound, and the alicyclic epoxy group at the end off the epoxy group-containing polyurethane compound is reacted with the epoxy-polyamine resin to introduce the alicyclic structure in the resin.

The following Examples illustrate this invention more specifically. In said Examples, "%" is all by weight.

PRODUCTION EXAMPLE 1

A flask fitted with a stirrer, a thermometer, a nitrogen introduction tube and a reflux condenser was charged with 137.1 g of polytetramethylene glycol (PTMG-1000, a trademark for a product of Sanyo Kasei Kogyo K.K., a hydroxyl value 109) and 48.9 g of 3-methyl-1,5-pentanediol (MPD, a trademark for a product of Kuraray Co., Ltd., a hydroxyl value 950.8), and they were stirred under a nitrogen atmosphere to form a uniform mixture. To this was added 146.4 g of hexamethylene diisocyanate (HMDI, a trademark for a product of Sumitomo Bayer Urethane K.K.) with stirring. Then, 0.2 g of dibutyltin dilaurate was added thereto. The resulting mixture was reacted at 50° C. for 4 hours to obtain a urethane prepolymer containing 8.19% of an isocyanate group.

To this was added 92 g of 3,4-epoxycyclohexyl methanol (made by Daicel Kagaku Kogyo K.K., an epoxy equivalent 142). Under a nitrogen atmosphere, the reaction was run at 70° C. for about 6 hours until the isocyanate group disappeared, and the reaction mixture was diluted with 148.9 g of methyl isobutyl ketone. Subsequently, 609.4 g of bisphenol A was added and dissolved, and 0.6 g of zinc borofluoride was added, followed by conducting the reaction at 100° C. until the epoxy group substantially disappeared. Further, to this were added 1,272.6 g of bisphenol diglycidyl ether having an epoxy equivalent of 190 and 21 g of diethanolamine. The reaction was run at 110° C. until the concentration of the epoxy group reached 0.727 mmol/g. Subsequently, the reaction mixture was diluted with 555.6 g of ethylene glycol monobutyl ether and cooled. When the temperature became 90° C., 173.3 g of diethanolamine was added, and the reaction was run until the epoxy group disappeared. There resulted a urethane-modified epoxy-polyamine resin (A-1) having a solids content of 78%, a primary hydroxyl equivalent of 676 and an amine value of 41.5.

PRODUCTION EXAMPLE 2

The same reaction vessel as used in Production Example 1 was charged with 126.5 g or polypropylene glycol (PP-950, a trademark for a product of Sanyo Kasei Kogyo K.K., a hydroxyl value 118.1) and 53.3 g of 1,6-hexanediol (a hydroxyl value 950.8), and they were stirred under a nitrogen atmosphere to form a uniform mixture. To this was added 152.6 g of hexamethylene diisocyanate (HMDI - a trademark for a product of Sumitomo Bayer Urethane K.K.) with stirring, and 0.2 g of dibutyltin dilaurate was added. The reaction was run at 50° C. for 4 hours to afford a urethane prepolymer containing 8.19% of the isocyanate group.

To this was added 92 g of 3,4-epoxycyclohexyl methanol (made by Daicel Kagaku Kogyo K.K., an epoxy equivalent 142), and the reaction was run under a nitrogen atmosphere at 70° C. for about 6 hours until the isocyanate group disappeared, followed by diluting the reaction mixture with 148.9 g of methyl isobutyl ketone. Then, 609.4 g of bisphenol A was added and dissolved, and 0.6 g of zinc borofluoride was added. The reaction was run at 100° C. until the epoxy group substantially disappeared. Moreover, 1,272.6 g of bisphenol diglycidyl ether having an epoxy equivalent of 190 and 21 g of diethanolamine were added thereto, arid the reaction was run at 110° C. until the concentration of the epoxy group reached 0.727 mmol/g. Subsequently, the reaction mixture was diluted with 555.6 g of ethylene glycol monobutyl ether and cooled. When the temperature became 90° C., 173.3 g of diethanolamine was added, and the reaction was conducted until the epoxy group disappeared. There resulted a urethane-modified epoxy-polyamine resin (A-2) having a solids content of 78%, a primary hydroxyl equivalent of 676 and an amine value of 41.5.

PRODUCTION EXAMPLE 3

The same reaction vessel as used in Production Example 1 was charged with 126.5 g of polypropylene glycol (PP-950, a trademark for a product of Sanyo Kasei Kogyo K.K., a hydroxyl value 118.1) and 46.3 g of 1,6-hexanediol (a hydroxyl value 950.8), and they were stirred under a nitrogen atmosphere to form a uniform mixture. To this was added 159.6 g of xylylene diisocyanate with stirring, and 0.2 g of dibutyltin dilaurate was then added, followed by conducting the reaction at 50° C. for 4 hours. There resulted a urethane polymer containing 8.19% of the isocyanate group.

To this was added 92 g of 3,4-epoxycyclohexyl methanol (made by a Daicel Kagaku Kogyo K.K., an epoxy equivalent 142). Under a nitrogen atmosphere, the reaction was run at 70° C. for about 6 hours until the isocyanate group disappeared, and the reaction mixture was diluted with 148.9 g of methyl isobutyl ketone. Then, 609.4 g of bisphenol A was added and dissolved, and 0.6 g of zinc borofluoride was added, followed by conducting the reaction at 100° C. until the epoxy group substantially disappeared. Moreover, to this were added 1,272.6 g of bisphenol A diglycidyl ether having an epoxy equivalent of 190 and 21 g of diethanolamine, and the reaction was conducted at 110° C. until the concentration of the epoxy group reached 0.727 mmol/g. Then, the reaction mixture was diluted with 555.6 g of ethylene glycol monobutyl ether and cooled. When the temperature reached 90° C. 173.3 g of diethanolamine was added, and the reaction was conducted until the epoxy group disappeared. There was obtained a urethane-modified epoxy-polyamine resin (A-3) having a solids content of 78%, a primary hydroxyl equivalent of 676 and an amine value of 41.5.

PRODUCTION EXAMPLE 4

The same reaction vessel as used in Production Example 1 was charged with 1,272.6 g of bisphenol A diglycidyl ether having an epoxy equivalent of 190, 535.8 g of bisphenol A, 21 g of diethanolamine and 150 g of methyl isobutyl ketone. The reaction was run at 110° C. until the concentration of the epoxy group reached 0.909 mmol/g. Then, the reaction mixture was diluted with 415 g of ethylene glycol monobutyl ether and cooled. When the temperature became 90° C., 173.3 g of diethanolamine was added, and the reaction was run until the epoxy group disappeared. There was obtained an epoxy-polyamine resin (A-4) having a solids content of 78%, a primary hydroxyl equivalent of 541 and an amine value of 51.8.

PRODUCTION EXAMPLE 5

The same reaction vessel as used in Production Example 1 was charged with 425.3 g of polypropylene glycol diglycidyl ether (made by Tohto Kasei K.K., an epoxy equivalent 315), 1,222.1 g of bisphenol A diglycidyl ether having an epoxy equivalent of 190, 659.1 g of bisphenol A, 21 g of diethanolamine and 150 g of methyl isobutyl ketone. The reaction was run at 120° C. until the concentration of the epoxy group reached 0.727 mmol/g. Then, the reaction mixture was diluted with 555.2 g of ethylene glycol monobutyl ether. When the temperature became 90° C., 173.3 g of diethanolamine was added, and the reaction was run until the epoxy group disappeared. There was obtained a modified epoxy-polyamine resin (A-5) having a solids content of 78%, a primary hydroxyl equivalent of 676 and an amine value of 41.5.

EXAMPLES 1, 2 and 3 and COMPARATIVE EXAMPLES 1 and 2

Each of the five resin solutions obtained in Production Examples 1 to 5 was mixed with methyl ethyl ketoxime blocked isophorone diisocyanate such that the amount of the blocked isocyanate group was equivalent to that of the primary hydroxyl group of the epoxy-polyamine resin.

One gram of polypropylene glycol (molecular weight 4000), 1.82 g of acetic acid and 1 g of lead acetate were added to 100 g (as a solids content) of the above resin composition. While heating to 40° C. and stirring, deionized water was gradually added and the mixture was dispersed therein to obtain a stable aqueous dispersion having a resin solids content of 30%. To 100 g (as a resin solids content) of the thus obtained aqueous dispersion were added 3 g of basic lead silicate, 13 g of titanium white, 0.3 g of carbon, 3 g of clay, 2 g of dibutyltin oxide and 1 g of a nonionic surface active agent (Noigen 142B, a trademark for a product of Daiichi Kogyo Seiyaku Co., Ltd.). The pigments were dispersed with a ball mill until the particle size became 10 microns or less. Further, the dispersion was diluted with deionized water such that the resin solids content became 15%.

Using the above obtained five diluted paints, cationic electrodeposition coating was conducted on an untreated steel plate at a bath temperature of 28° C. and a voltage of 250 V for 3 minutes. These electrodeposition coated plates were baked at 160° C. for 20 minutes to obtain the baked coated panels. The test results of the coated panels are shown in Table 1.

The test methods in Table I are as follows.

* 1 Impact resistance (du-Pont system)

The test plate was placed in a constant temperature/constant humidity chamber having a temperature of 20°±1° C. and a humidity of 75±2% for 24 hours. Then, a du-Pont impact tester was fitted with a receiving base of a prescribed size and a shock core. The test plate was held therebetween with the coated surface up. Thereafter, a load of a prescribed weight fell down on the shock core, and a maximum height at which crack and delamination owing to shock were not observed on the coated film was measured.

* 2 Bending resistance

After the test plate was placed in a constant temperature/constant humidity chamber having a temperature of 20°±1° C. and a humidity of 75±2% for 24 hours, 180° bending was conducted for 1 to 2 seconds. The results were evaluated as follows.

◯: No abnormality is found on the front and the back of the bent portion.

X: Abnormality such as crack, delamination, or the like is found on at least one of the front and the back of the bent portion.

* 3 Salt spray resistance

Crosscuts were applied to the coated plate, and the test was run according to JIS Z2871. After 480 hours, the crosscut portion was peeled off with a cellophane adhesive tape, and the peeling width was measured.

TABLE 1

|  |  | Example | | | Comparative Example | |
| --- | --- | --- | --- | --- | --- | --- |
|  |  | 1 | 2 | 3 | 1 | 2 |
| Basic resin | | | | | | |
| Type (production Example No.) | | A-1 (1) | A-2 (2) | A-3 (3) | A-4 (4) | A-5 (5) |
| Solids content (g) | | 77 | 77 | 77 | 77 | 77 |
| Curing agent | | | | | | |
| Methyl ethyl kitoxime blocked isophorone diisocyanate solids content (g) | | 23 | 23 | 23 | 23 | 23 |
| Properties of a coated film | | | | | | |
| Appearance | Visual, estimation | good | good | good | Pinhole occurs | good |
| Impact resistance*1 | du-Pont tester 500, ½ inch (cm) | 50< | 50< | 50< | 30 | 50< |
| Bending resistance*2 | Bending tester (10 mmφ) | ◯ | ◯ | ◯ | X | ◯ |
| Salt spray resistance*3 | | 0.5 | 0.7 | 0.3 | 1.0 | 5 or more |

What we claim is:

1. An aqueous resin dispersion containing as an aqueous resin component a polyurethane-modified epoxypolyamine resin comprising a reaction product of
    (A) an epoxy group-containing polyurethane compound obtained by the reaction of
        (a) a polyhydroxy compound having a number average molecular weight of 50 to 8,000,
        (b) a polyisocyanate compound, and
        (c) a compound containing one hydroxyl group and at least one alicyclic epoxy group in a molecule,
    (B) a bisphenol compound,
    (C) a bisphenol diglycidyl ether compound, and
    (D) an active hydrogen-containing amine compound.

2. The aqueous resin dispersion of claim 1 wherein the polyhydroxy compound (a) has a number average molecular weight of 50 to 6,000.

3. The aqueous resin dispersion of claim 1 wherein the polyhydroxy compound (a) contains on the average 2 to 4 hydroxyl groups in a molecule.

4. The aqueous resin dispersion of claim 1 wherein the polyhydroxy compound (a) is selected from the group consisting of a polyhydric alcohol, a polyester polyol, a polyether polyol and a mixture thereof.

5. The aqueous resin dispersion of claim 1 wherein the polyhydroxy compound (a) is a mixture of a low-molecular-weight polyhydroxy compound having a number average molecular weight of 50 to 499 and a high-molecular-weight polyhydroxy compound having a number average molecular weight of 500 to 8,000.

6. The aqueous resin dispersion of claim 1 wherein the polyhydroxy compound (a) is ethylene glycol, propylene glycol, 1,6-hexanediol, butanediol, polypropylene glycol, polytetramethylene glycol or ring-opened polycaprolactone.

7. The aqueous resin dispersion of claim 1 wherein the polyisocyanate compound (b) is isophorone diisocyanate, hexamethylene diisocyanate or xylylene diisocyanate.

8. The aqueous resin dispersion of claim 1 wherein the compound (c) containing one hydroxyl group and at least one alicyclic epoxy group in the molecule has a number average molecular weight of 100 to 5,000 and an epoxy equivalent of 100 to 1,000.

9. The aqueous resin dispersion of claim 1 wherein the compound (c) containing one hydroxyl group and at least one alicyclic epoxy group in the molecule has a melting point of 130° C. or lower.

10. The aqueous resin dispersion of claim 1 wherein the compound (c) containing one hydroxyl group and at least one alicyclic epoxy group in the molecule is selected from the group consisting of compounds represented by the following formulas,

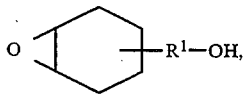
(I)

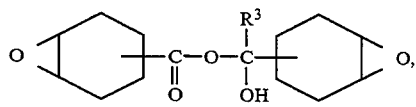
(II)

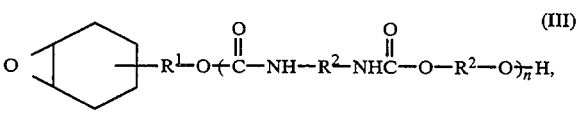
(III)

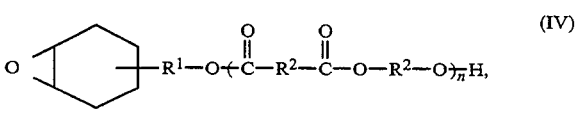
(IV)

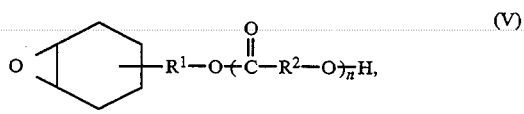
(V)

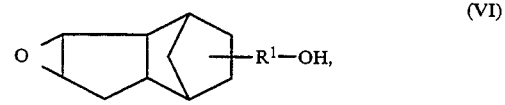
(VI)

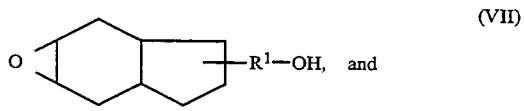
(VII)

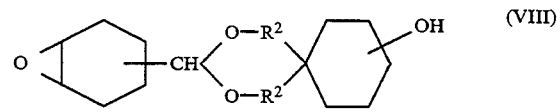
(VIII)

wherein $R^1$ denotes a direct bond or a $C_{1-20}$ divalent hydrocarbon group, $R^2$'s are the same or different and each denotes a $C_{1-8}$ hydrocarbon group, $R^3$ denotes H or $CH_3$, and n is an integer of 1 to 10.

11. The aqueous resin dispersion of claim 1 wherein the compound containing one hydroxyl group and at least one alicyclic epoxy group in the molecule is selected from the group consisting of compounds represented by the following formulas,

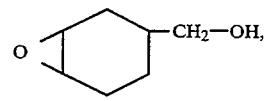

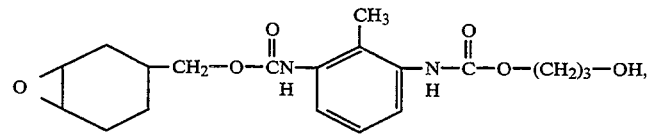

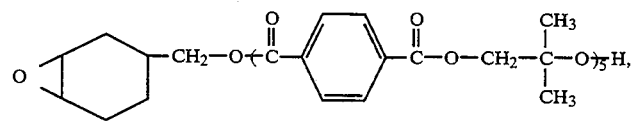

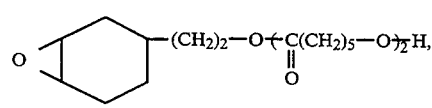

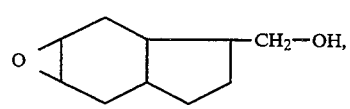

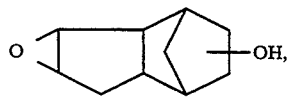

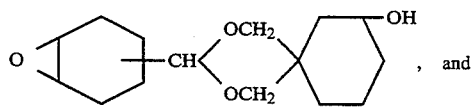, and

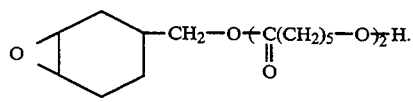

12. The aqueous resin dispersion of claim 1 wherein the epoxy group-containing polyurethane compound (A) obtained by the reaction of, based on the total weight of the three components (a), (b) and (c), 5 to 80% by weight of the compound (a), 5 to 90% by weight of the compound (b) and 10 to 90% by weight of the compound (c).

13. The aqueous resin dispersion of claim 12 wherein the epoxy group-containing polyurethane compound (A) is obtained by the reaction of, based on the total weight of the three components (a), (b) and (c), 20 to 60% by weight of the compound (a), 10 to 60% by weight of the compound (b) and 30 to 70% by weight of the compound (c).

14. The aqueous resin dispersion of claim 1 wherein the epoxy group-containing polyurethane compound (A) has a number average molecular weight of 400 to 10,000 and an epoxy equivalent of 100 to 5,000.

15. The aqueous resin dispersion of claim 1 wherein the bisphenol compound (B) is a compound represented by formula (IX)

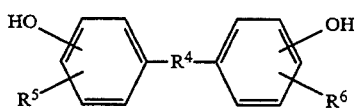 (IX)

wherein $R^4$ denotes

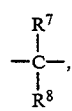

—O— or —SO$_2$—, $R^7$ and $R^8$ each denote a hydrogen atom or a linear or branched C$_{1-10}$ alkyl group, and $R^5$ and $R^6$ each denote a hydrogen atom or a linear or branched C$_{1-3}$ alkyl group.

16. The aqueous resin dispersion of claim 1 wherein the bisphenol compound (B) is selected from the group consisting of bis(4-hydroxyphenyl)-2,2-propane (bisphenol A), bis(4-hydroxyphenyl)-1,1-ethane, bis(4-hydroxyphenyl)methane (bisphenol F), 4,4'-dihydroxydiphenyl ether, 4,4'-dihydroxydiphenylsulfone, bis(4-hydroxyphenyl)-1,1-isobutane, and bi-4-hydroxy-3-tert-butylphenyl)-2,2-propane.

17. The aqueous resin dispersion of claim 1 wherein the bisphenol diglycidyl ether compound (C) is a compound represented by formula (X)

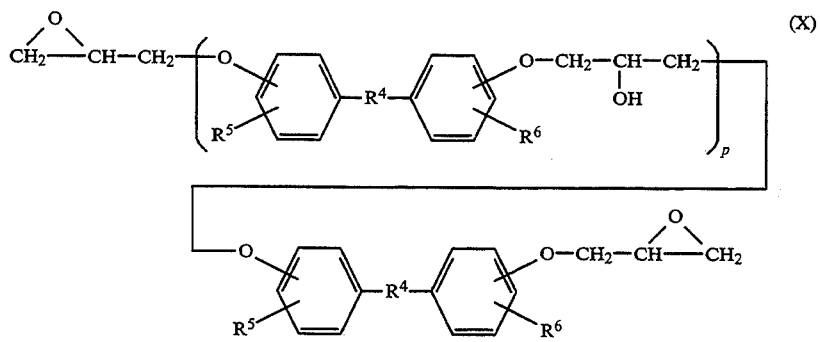 (X)

wherein $R^4$ denotes

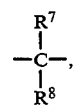

—O— or —SO$_2$—, $R^7$ and $R^8$ each denote a hydrogen atom or a linear or branched C$_{1-10}$ alkyl group, $R^5$ and $R^6$ each denote a hydrogen atom or a linear or branched C$_{1-13}$ alkyl group, and p is an integer of 0 to 10.

18. The aqueous resin dispersion of claim 1 wherein the bisphenol diglycidyl ether compound (C) has a number average molecular weight of 320 to 2,000 and an epoxy equivalent of 160 to 1,000.

19. The aqueous resin dispersion of claim 17 wherein the bisphenol diglycidyl ether compound (C) is bisphenol A diglycidyl ether represented by the following formula.

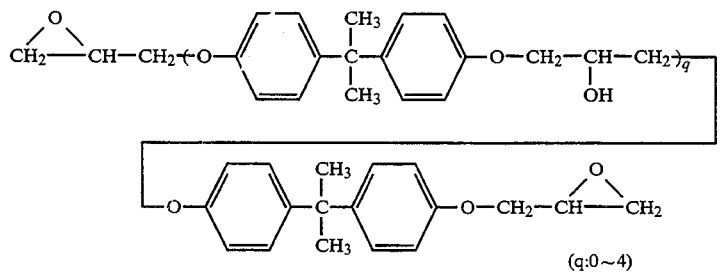

(q:0~4)

20. The aqueous resin dispersion of claim 1 wherein the amine compound (D) is selected from the group consisting of aliphatic, alicyclic or araliphatic, primary or secondary amines, alkanolamines and tertiary amine salts.

21. The aqueous resin dispersion of claim 1 wherein the amine compound (D) is diethanolamine, diethylamine, N-methylethanolamine or N-ethylethanolamine.

22. The aqueous resin dispersion of claim 1 wherein the polyurethane modified epoxy-polyamine resin is obtained by reacting the epoxy group-containing polyurethane compound (A) with the bisphenol compound (B) and the bisphenol diglycidyl ether compound (C), and adding the amine compound (D) to the obtained polyurethane modified epoxy resin.

23. The aqueous resin dispersion of claim 22 wherein based on the total weight of the three components (A), (B) and (C), 10 to 70% by weight of the compound (A), 5 to 60% by weight of the compound (B) and 10 to 70% by weight of the compound (C) are reacted.

24. The aqueous resin dispersion of claim 22 wherein the polyurethane-modified epoxy resin has a number average molecular weight of 1,000 to 20,000.

25. The aqueous resin dispersion of claim 22 wherein the amine compound (D) is used in such an amount that the amine value of the formed polyurethane-modified epoxy-polyamine resin is 5 to 100.

26. The aqueous resin dispersion of claim 1 wherein the polyurethane-modified polyepoxy-polyamine resin is water-solubilized or water-dispersed by treatment with a water-soluble organic acid.

27. A paint for cathode electrodeposition coating which is composed of the aqueous resin dispersion of claim 1.

28. An article coated with the paint of claim 27.

29. A method for cathodic electrodeposition coating a substrate, which comprises immersing the substrate in the aqueous resin dispersion of claim 1, and subsequently passing an electric current through the dispersion between an anode and the substrate as a cathode.

* * * * *